Figure 1:
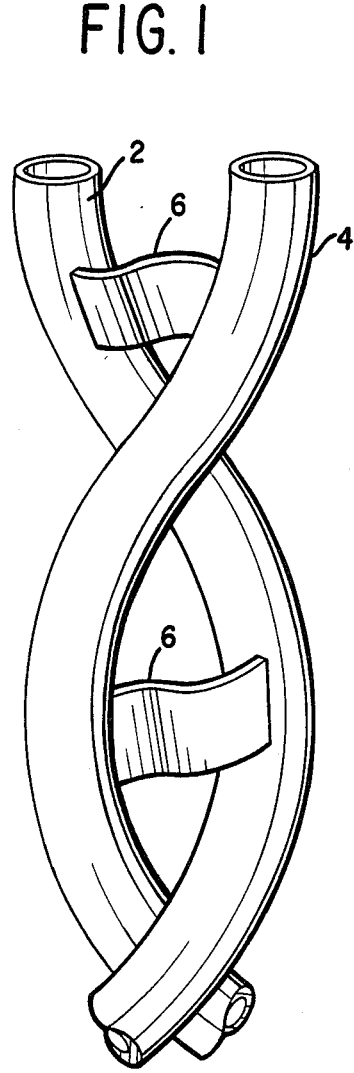

United States Patent [19]

Mogensen

[11] Patent Number: 4,867,229
[45] Date of Patent: Sep. 19, 1989

[54] METHOD AND MEANS FOR APPLYING A HEAT EXCHANGER IN A DRILL HOLE FOR THE PURPOSE OF HEAT RECOVERY OR STORAGE

[76] Inventor: Palne Mogensen, Emblavägen 29, S-182 63 Djurscholm, Sweden

[21] Appl. No.: 139,228

[22] Filed: Dec. 29, 1987

[30] Foreign Application Priority Data

Jul. 2, 1985 [SE] Sweden .................. 8503288

[51] Int. Cl.⁴ .................. F24D 23/12
[52] U.S. Cl. .................. 165/1; 165/45; 165/76; 62/260
[58] Field of Search .......... 165/1, 45, 162, 156, 165/76; 62/260

[56] References Cited

U.S. PATENT DOCUMENTS

| | | | |
|---|---|---|---|
| 1,823,661 | 9/1931 | O'Brien | 62/260 |
| 2,554,661 | 5/1981 | Clancy | 165/45 |
| 3,183,675 | 5/1965 | Schroeder | 62/260 |
| 4,286,366 | 9/1981 | Vinyard | 165/162 |
| 4,448,238 | 5/1984 | Singleton, Jr. et al. | 165/45 |
| 4,715,429 | 12/1987 | Morgensen | 165/45 |
| 4,741,388 | 5/1988 | Kuroiwa | 165/45 |

FOREIGN PATENT DOCUMENTS 2943492  5/1981  Fed. Rep. of Germany .
408087   5/1979  Sweden .
653120   12/1985 Switzerland .

Primary Examiner—John Ford
Attorney, Agent, or Firm—Armstrong, Nikaido, Marmelstein, Kubovcik & Murray

[57] ABSTRACT

A method for applying a heat exchanger in a drill hole and an apparatus for carrying out such method, comprising the steps of lowering at least one pair of heat-exchanging pipes helically wound and spaced apart by expandable spacers into a drilled hole and expanding the pipes into contact with the wall of the drilled hole by turning such pipes in the spiralled direction.

7 Claims, 1 Drawing Sheet

METHOD AND MEANS FOR APPLYING A HEAT EXCHANGER IN A DRILL HOLE FOR THE PURPOSE OF HEAT RECOVERY OR STORAGE

This application is a continuation-in-part of application Ser. No. 874,962, filed June 16, 1986, now U.S. Pat. No. 4,715,429, and relates to a method and apparatus for applying a heat exchanger in a drill hole in a rock, loose soil, or the like, for the purpose of heat recovery of storage, achieving a more efficient heat transfer between the defining surface of the drill hole and a heating medium contained in the heat exchanger, and to a heat exchanger for performing the method.

Drill holes, suitably spaced in the case of several holes, are often used for the purpose of heat recovery or storage in rock or loose soils. However, to avoid problems with the quality of the ground water, it is generally preferred to recover the heat via a heat exchanger or heat collector arranged in the drill hole, through which a heating medium in the form of a liquid protected against freezing is allowed to circulate. A conventional design comprises a heat exchanger in the form of a U-pipe in which both shanks consist of polyethylene pipes.

It has been found that a considerable portion of the drop in temperature from the interior of the rock to the heat-conducting liquid occurs during heat transfer between the wall of the drill hole and the circulating liquid.

The temperature drop between the wall of the drill hole and the heating medium comprises three components. The first is caused by the heat resistance in the water between the wall of the drill hole and the exterior of the pipe. With the hole and the pipe dimensions and the the temperature occurring in practice, it has been found that there is negligible convection in the water. The heat transfer thus occurs only by means of conductance. However, water is a poor heat conductor and its thermal conductivity should be compared with that of ice, for instance, which has almost four times greater thermal conductivity than water. The thermal conductivity is thus improved if heat recovery is continued until the water freezes in the hole. However, the problem always remains if heat is to be supplied to the rock or soil.

The next component in the temperature drop is caused by the thermal resistance in the pipe wall. This can easily be calculated by means of known formulae and decreases with increasing pipe diameter and decreasing wall thickness.

The third component is the heat transfer resistance between the inside of the pipe wall and the heating medium. This is primarily dependent on whether laminar or turbulent flow prevails in the heating medium, but pipe dimensions and surface structure are also significant. However, sufficiently low, often negligible heat transfer resistance can always be obtained by increasing the flow rate.

To obtain slight temperature drop between the wall of the drill hole and the liquid heating medium, therefore, heatingconducting stretches for the drill-hole water should be short and the pipe should be thin-walled and have large diameter. These requirements are contrary to the desired features of conventional heat collectors in other respects. The clearance between pipe and drill-hole wall should be as large as possible to enable conventional heat collectors to be fitted and the pipe wall should be thick to offer satisfactory security against rupture.

The object of the present invention is to eliminate the above-mentioned drawbacks associated with conventional technology and to effect aa method and means of the type described in the introduction which will achieve a more efficient heat transfer between the surrounding drill-hole and the liquid heating medium.

This is achieved in the method of the instant invention primarily in at least one heat-exchanging element is lowered into the drill hole, the heat-exchanging element is expanded in substantially radial direction and the heat-exchanging element is, thus, caused, at least partially, to be substantially in contact with the defining surface of the drill hole.

The method according to the invention can suitably be performed by means of a heat exchanger characterized in that it comprises a heat-exchanging element arranged to expand in a substantially radial direction to be substantially in contact with the defining surface of the drill hole.

According to the instant invention, the heat-exchanging element is in the form of spaced helically-wound pipes, spaced from each other, at spaced locations axially along the pipes, with spacers which shorten and lengthen as the pipe assembly is turned, first in one direction and then in the opposite direction.

In the instant invention, the helically-wound pipes, with contractable and expandable spacers at fixed longtudinal locations between the helically wound pipes, are first rotated in one direction to shorten the spacers and reduce the diameter of the helical assembly, the rotated helical assembly of helically wound pipes is inserted, longitudinally, into the drill hole and the helical wound pipe assembly, in place in the drill-hole, is then rotated in the reverse direction to lengthen the spacers and bring the outer circuference of the helically wound pipes in the assembly into engagement with the drill-hole wall.

Figure 2:
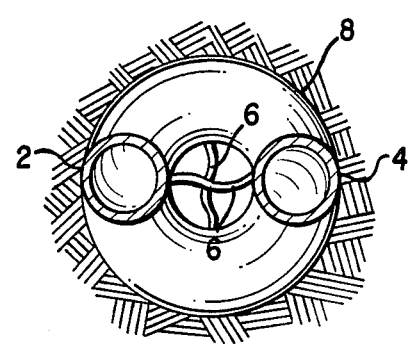
Figure 3:
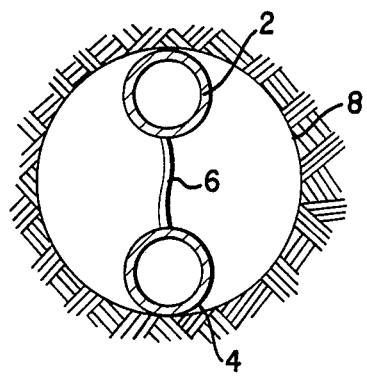

The instant invention will be more completely described and will be better understood from the following description taken with the appended drawings of a preferred embodiment of the invention, in which FIG. 1 is a side view of the helical wound pipe assembly of the instant invention;

FIG. 2 is an end view of the helically wound pipe assembly of FIG. 1 with the helically wound pipes rotated in the first direction to reduce the outer circumference of the helically wound pipe assembly and with the wound assembly inserted longitudinally into the drill-hole, and FIG. 3 is an end view, similar to FIG. 2, but showing the helically wound pipe assembly after the assembly has been rotated in the reverse direction to bring the outer circumference of the helically wound pipes into intimate contact with the drill-hole wall.

As best shown in FIG. 1, the apparatus of the instant invention includes pipes 2 and 4, wound spiralling in a clockwise direction. Pipes 2 and 4 are inter-connected at spaced intervals by spacers 6 extending radially from and fixed at their opposite ends to the outer circumference of each of the pipes. For reasons which will be more apparent from the description hereinafter, the combined diameter of pipes 2 and 4 and effective length of spacer 6, at the time the apparatus of the instant invention is to be inserted in the drill-hole, is slightly less than the diameter of such drill hole and, when installed in the drill-hole and the helix is expanded, such combined diameter and effective length is equal to or slightly longer than the diameter of the drill-hole.

Pipes 2,4 and spacers 6 may be of any material having the required flexibility and suitable for the environment in which the apparatus is to be installed and used. Preferrably, the pipes 2, 4 and spacers 6 are of a polyethylene or other plastic material fabricated and assembled so that, when the helical pipe assembly is in the drillhole, the outer wall of pipes 2 and 4 will be in intimate contact with the drill-hole wall. The pipes may be made in any manner but, preferably, when made of polyethylene or similar plastic, are extruded.

Referring to FIG. 2, in order to install the helical pipe assembly in drill-hole 8, which as previously drilled, or otherwise formed, in the earth, the helical pipes are turned in a first direction to tighten the helix and the tightened helical pipe assembly is inserted, lengthwise, in the drill-hole. Once in place in the drill-hole, the helical pipes are turned in the opposite direction to bring the outer walls of the pipes into contact with the wall of the drill-hole. The helical pipe walls are then held in contact with the drill-hole wall as shown in FIG. 3.

The helical pipes 2,4 and the spacers 6 may be of a resilient material and assembled with the helical pipes 2,4 in the expanded position, that is, with the outer walls of the pipes in the helical assembly at, or just beyond, the diameter of the drill-hole into which the assembly is to be inserted. In such an arrangement, the pipes could be turned in the first direction to contract the helically assembled pipes and the contracted assembly could be held until positioned in place within the drill hole. Means for holding the assembly in its contracted state are disclosed in the parent application 874,962, now U.S. Pat. No. 4,715,429. Such contracted helical assembly, in place in the drill-hole, could then be released to allow the resiliency of the pipes and spacers to expand the assembly and bring the pipe walls into contact with the inner wall of the drill-hole. In such an arrangement, it is preferred that the expanded position of the pipes, at the time of fabrication, be just beyond the diameter of the drill-hole into which the assembly will be installed. Such added length of the spacers assures better contact of the pipe walls with the inner wall of the drill-hole and better maintenance of such contact.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed:

1. A method of applying a heat exchanger in a drill hole provided in rock, loose soil or the like for the purpose of heat recovery or storage, and achieving an efficient heat transfer between a wall defining the drill hole and a heat transporting medium contained in the heat exchanger, comprising the steps of:

lowering a pair of helically wound heat-exchanging pipes into position within the drill hole; and expanding said pipes radially into at least partial contact with the wall of said drill hole by unwinding said pipes and increasing the radial distance between said pipes.

2. A method according to claim 1, including winding said pair of heat-exchanging pipes into a contracted assembly configuration prior to insertion into the drill hole, and holding said pair of heat-exchanging pipes in the contracted assembly configuration until positioned in place within the drill hole.

3. A method according to claim 2, wherein said pair of heat-exchanging pipes are unwound once inserted within the drill hole by rotating the pair of heat-exchanging pipes in a reverse direction to that required to obtain the contracted assembly configuration.

4. A method according to claim 2, including providing spacers to interconnect said pair of helically wound heat-exchanging pipes; and releasing said pair of heat-exchanging pipes in the contracted assembly configuration to allow the resiliency of the pipes and spacers to expand the contracted assembly and bring the pipes into at least partial contact with the surface of the drill hole.

5. A heat exchanger adapted for use in a drill hole in rock, loose soil or the like, comprising:

at least two heat exchanging pipes substantially uniformly spaced from and extendable along a central axis of the drill hole, said pipes having a helix configuration to provide decreasing or increasing the spacing of said pipes from the central axis to decrease or increase the overall radial dimension of the heat exchanger by winding and unwinding, respectively, the heat exchanger so as to contact the heat exchanging pipes with a defining surface of the drill hole.

6. A heat exchanger adapted for use in a drill hole in rock, loose soil or the like comprising:

at least two heat-exchanging pipes uniformly spaced from and extendable along a central axis of the drill hole and spacer means extending from and interconnecting said pipes at intervals along the central axis and capable of decreasing or increasing the spacing of said pipes from said central axis to decrease or increase an overall radial dimension of the heat exchanger so as to contact the heat exchanging pipes with a defining surface of the drill hole.

7. The heat exchanger of claim 6 wherein said pipes are capable of being helically wound and unwound around said central axis to decrease and increase, respectively, the spacing of said pipes from the axis.

* * * * *